United States Patent [19]

Detriché et al.

[11] Patent Number: 4,689,469
[45] Date of Patent: Aug. 25, 1987

[54] APPARATUS FOR SCANNING A MEMBER IN A PLANE PERPENDICULAR TO ITS FORWARD MOVING DIRECTION

[75] Inventors: Jean-Marie Detriché, Montesson; Didier Houche, Orsay, both of France

[73] Assignee: Commissariat a l'Energie Atomique, Paris, France

[21] Appl. No.: 731,972

[22] Filed: May 8, 1985

[30] Foreign Application Priority Data

May 15, 1984 [FR] France .................... 84 07493

[51] Int. Cl.[4] ............................... B23K 9/12
[52] U.S. Cl. ...................... 219/125.12; 318/575
[58] Field of Search .......... 219/125.12, 125.1, 125.11, 219/124.22; 318/575

[56] References Cited

U.S. PATENT DOCUMENTS 4,150,329  4/1979  Dahlstrom ............... 219/125.12
4,316,075  2/1982  Isoya et al. .
4,434,352  2/1984  Nomura et al. .

FOREIGN PATENT DOCUMENTS 51-68452  6/1976  Japan ................ 219/125.12
2090434  12/1981  United Kingdom .

Primary Examiner—Clifford C. Shaw
Attorney, Agent, or Firm—Cesari and McKenna

[57] ABSTRACT

The present apparatus scans a torch or other member in two directions contained in a scanning plane perpendicular to its advance direction. The apparatus includes means for controlling the speed of the torch in one direction and a means for controlling the position of the torch in the other direction are provided. There is also a position coder in accordance with the first direction supplying a signal which is compared with a reference amplitude, the result of the comparison supplying a signal for synchronizing the movements of the torch in said direction. Regulating means for defining the path of the torch in the scanning plane are also provided.

12 Claims, 16 Drawing Figures

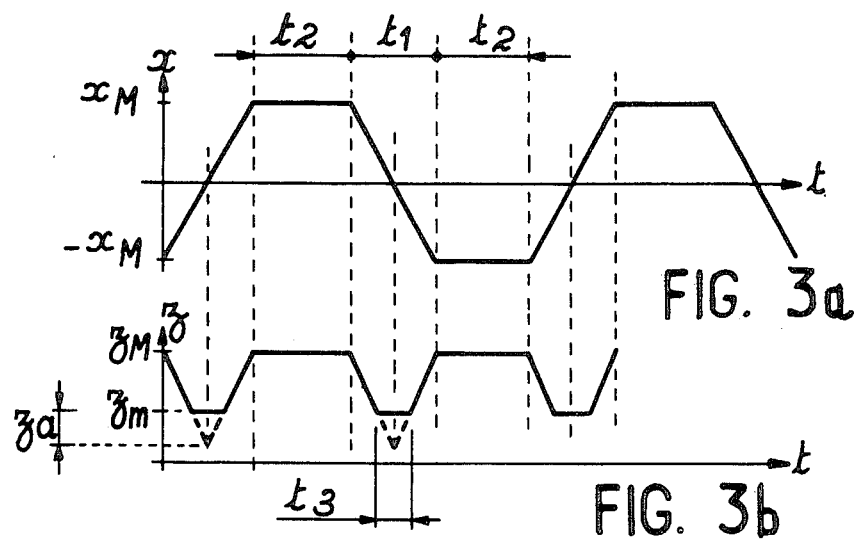
FIG. 3a
FIG. 3b
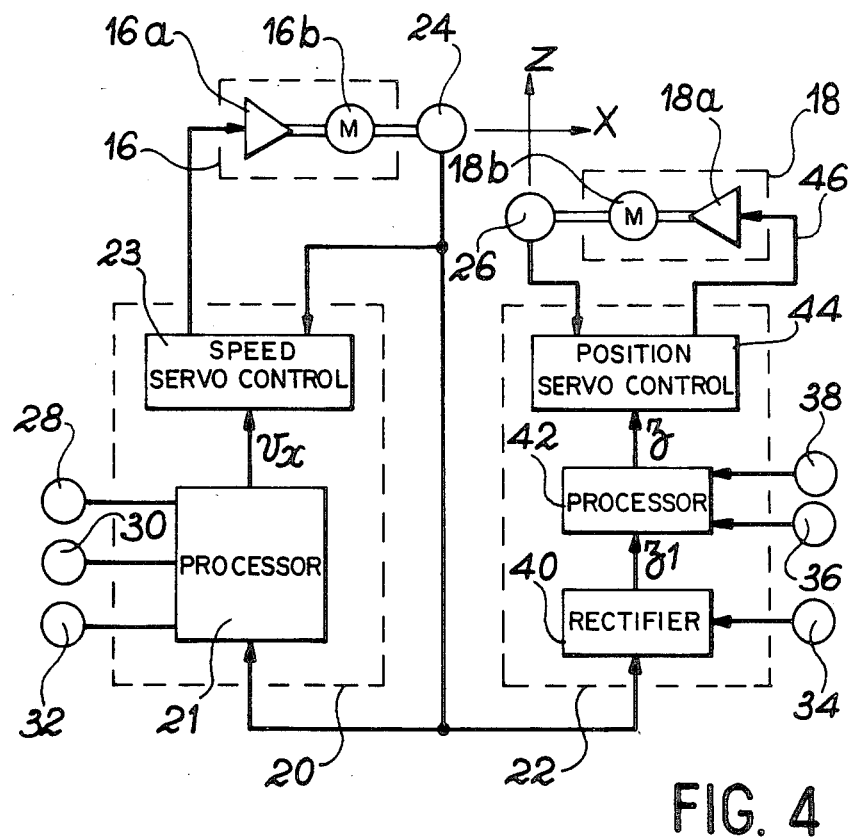
FIG. 4

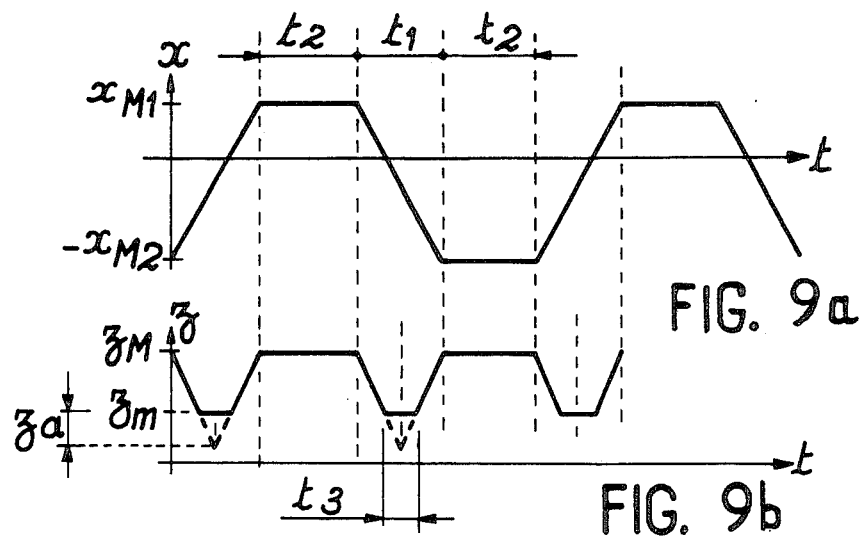
FIG. 9a
FIG. 9b
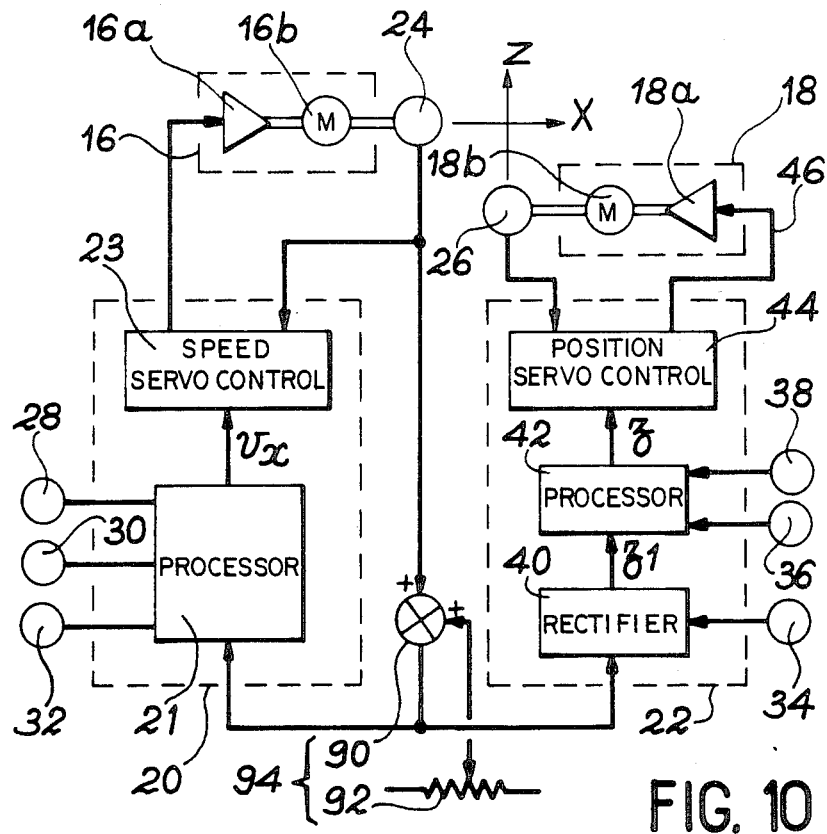
FIG. 10

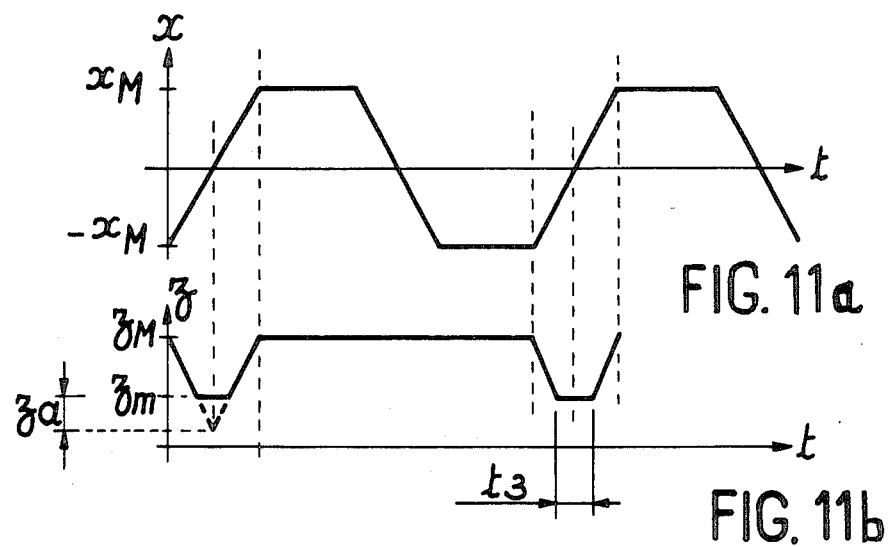
FIG. 11a
FIG. 11b
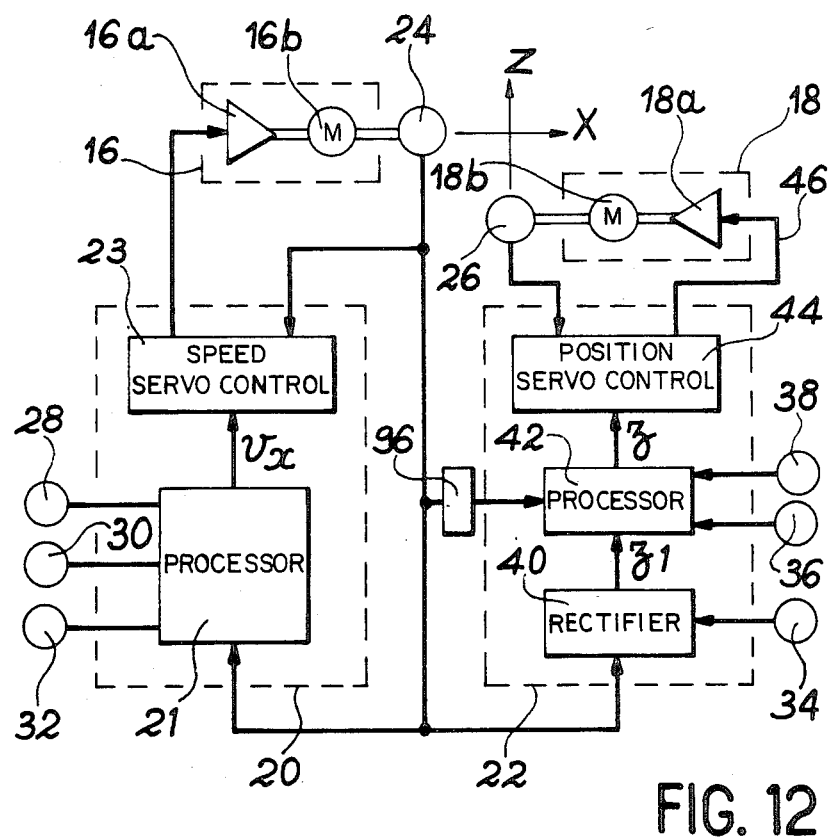
FIG. 12

APPARATUS FOR SCANNING A MEMBER IN A PLANE PERPENDICULAR TO ITS FORWARD MOVING DIRECTION

BACKGROUND OF THE INVENTION

The present invention relates to an apparatus for scanning a member in a plane perpendicular to its forward movement direction and more especially applied to the scanning of a welding torch in two directions contained in a scanning plane perpendicular to its forward movement direction for filling by means of a welding bead a joint between two parts.

However, the invention is not limited to the scanning of a welding torch, also applying e.g. to the scanning of a non-destructive control sensor, a cutting, machining, milling, gluing or other type of tool or the like.

The scanning movement of a welding torch is necessary for filling angled joints or those having wide chamfers. This scanning movement is carried out in a plane perpendicular to the forward movement of the welding torch along said joint. It is generally used for processes with a good filling power, such as MIG, MAG and lined wire processes.

In conventional apparatuses, the scanning movement is limited to one scanning direction along which the welding torch has an oscillatory movement. This scanning direction contained in the plane perpendicular to the advance of the torch is often parallel to the external bisector of the welding joint.

FIG. 1 is a diagrammatic drawing illustrating the scanning movement of the torch in known apparatuses. The welding torch 2 is placed right in front of a joint 4 defined by the juxtapositioning of two chamfered parts 6, 8. These parts are shown in section in a plane transverse to the direction of the joint. An arrow 10 indicates the movement of the welding torch 2 in this cutting plane.

The curve of position x of the end of the welding torch 2 on the scanning axis X as a function of the time t is also shown, in correspondence with said joint. The movement of the welding torch is totally determined by the amplitude a of its oscillation, the duration of $t_e$ of the time lag at the ends and the scanning speed. These variables, which define the oscillation period T, can be independently adjusted, which makes it possible to optimize the welding, no matter what the configuration of the joint and the welding procedure used. However, this method is not always adequate for completely filling the joint with a welding bead, particularly when the joint is very open.

The object of the invention is to obviate this disadvantage. For filling angle joints and wide chamfers, an attempt is made to produce a bidimensional scanning movement in the plane transverse to the forward movement of the welding torch. In order to follow the profile of the joint in an optimum manner, it is important to be able to independently vary the torch displacement parameters.

In order to achieve this objective, it is possible to utilize a welding torch support system with two crossed carriages, each actuated or operated by a motor. However, the generation of electronic position signals synchronized along the two scanning axes is difficult to realize in a simple manner.

SUMMARY OF THE INVENTION

The object of the invention is a scanning apparatus, which produces in a simple manner movements along each of two scanning directions.

The invention specifically relates to an apparatus for scanning a member in a plane perpendicular to its forward movement direction, comprising a first means for the displacement of the member in a first direction contained in the scanning plane, a second means for the displacement of the member in a second direction contained in the scanning plane, a speed control means connected to the first displacement means and defining the law of motion in said first direction, wherein it also comprises a position control means connected to the second displacement means and defining the law of motion in the second direction, said position control means receiving a position signal supplied by a position coder associated with the displacement means in the first direction and said control means are synchronized by a signal which is a function of the result of the comparison between the amplitude of said position signal and a reference amplitude.

In a preferred manner, the scanning directions are perpendicular to one another and to the advance direction. In the case of welding, they are in a preferred manner the external bisector of the joint and the internal bisector of the joint.

According to another feature of the apparatus according to the invention, regulating means are provided for determining the law of motion in each direction.

According to a secondary feature, regulating means associated with the speed control means comprise a means for regulating the speed by the amplitude of the speed control signal, a means for regulating the time lag by the duration of a pulse released by a synchronization signal and a means for regulating the amplitude of the displacement in the first scanning direction.

According to another secondary feature, the regulating means associated with the position control means comprise a means for regulating the slope of the joint by a gain applied to the position signal in the first direction, a means for regulating the rounded portion by a signal displacement and a rectification and a displacement means along the second scanning direction by a further signal displacement.

BRIEF DESCRIPTION OF THE DRAWINGS

The invention is described in greater detail hereinafter relative to non-limitative embodiments and the attached drawings, wherein show:

FIGS. 3a and 3b are chronograms illustrating the laws of motion of the welding torch in scanning directions X and Z of FIG. 2.

FIG. 4 is a functional diagram of the apparatus according to the invention.

FIGS. 9a and 9b are chronograms illustrating the laws of motion of the welding torch, in which the scanning movement is displaced relative to direction X.

FIG. 10 is a functional diagram of the apparatus according to the invention for performing the scanning movement shown in FIGS. 9a and 9b.

FIGS. 11a and 11b are chronograms illustrating the laws of motion of the welding torch, in which the scanning in direction Z is limited to the times where the welding torch moves in a given sense in direction X, and FIG. 12 is a functional diagram of the apparatus according to the invention for performing the scanning movement shown in FIGS. 11a and 11b.

DETAILED DESCRIPTION OF THE PREFERRED EMBODIMENTS

Figure 1:
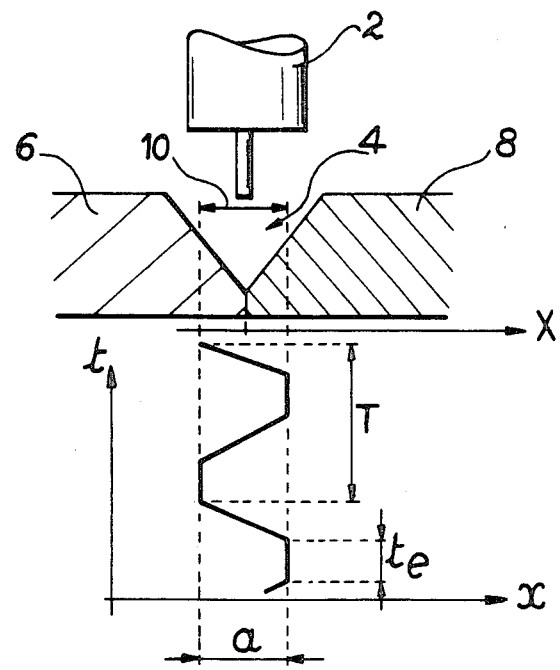
FIG. 1, already described, illustrates the unidimensional scanning movement of a welding torch according to the prior art.
Figure 2:
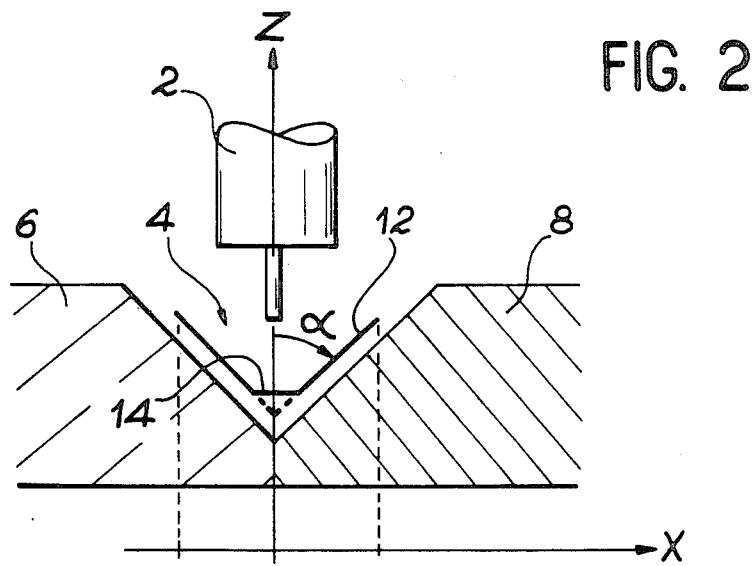
FIG. 2, is a sectional view of a welding joint illustrating the scanning movement of the welding torch according to the invention.

FIG. 2 illustrates a scanning movement of the welding torch 2 performed by the scanning apparatus according to the invention. The scanning movement is obtained by combining two oscillatory movements in two perpendicular directions X and Z which, in the present case, are respectively parallel to the external bisector of joint 4 defined by the juxtapositioning of two parts 6 and 8 and to the internal bisector of said same joint. Other directions can be chosen and are preferably perpendicular to one another.

The location of welding torch 2 in this scanning plane is represented by curve 12. In reality, as the torch has an advance movement in the direction of the joint at the same time as a scanning movement, curve 12 does not represent the scanning movement of the torch in a fixed plane, but instead the projection of said movement in a fixed plane. In said fixed plane, curve 12 is preferably parallel to the sides of the joint. It can have a rounded portion in its lower part, i.e. in the center of the travel of the torch in the direction of axis X permitting the regulation of the deposited metal quantity. A simple way of obtaining this rounded portion consists of locking the position of the torch along axis Z. The torch then describes the curve segment 14.

According to the invention, the oscillatory movements of the torch along the two axes X and Z are synchronized. It is obvious that this synchronization must take account of the value $\alpha$ of the opening angle of the joint. FIGS. 3a and 3b show chronograms representing these synchronized oscillatory movements.

The movement in the direction of axis X is defined by three parameters, namely the amplitude $x_M$ of the movement, the speed $V_x$ of the movement which is linked with the time $t_1$ for moving the welding torch from position $-x_M$ to position $+x_M$, and the time lag $t_2$ when the torch is in position $\pm x_M$. During time $t_2$, there is no scanning movement. The torch is locked in directions X and Z, but the torch can move in the advance direction perpendicular to the scanning plane.

In order to follow the profile of the joint, the movement along axis Z must be synchronized with the movement along axis X. FIG. 3b represents the configuration of the oscillatory movement of the welding torch along axis Z. This movement is defined by the minimum $z_m$ and maximum $z_M$ amplitudes of the torch. The torch time lag in positions $(x_M, z_M)$ and $(-x_M, z_M)$ is equal to $t_2$. The time $t_3$ of locking of said torch in the direction of axis Z is linked with the value $z_a$, which defines the rounded portion, and with the torch displacement speed $v_z$ along axis Z, which is itself a function of speed $v_x$ for the displacement along axis X and the slope $\alpha$ of the joint.

This bidirectional scanning movement is produced in a simple way by the apparatus according to the invention. A synoptic diagram of this apparatus is shown in FIG. 4.

This apparatus comprises a first displacement means 16 for producing a movement of the welding torch along axis X, a second displacement means 18 for producing a movement of the welding torch along axis Z, a means 20 for controlling the first displacement means 16, a means 22 for controlling the second displacement means 18, a position coder 24 along axis X supplying a reference signal to control means 20 and a position coder 26 along axis Z supplying a reference signal to control means 22. Finally, the apparatus comprises regulating means 28, 30, 32, 34, 36, 38 making it possible to define the laws of motion in accordance with each of the scanning axes.

The synchronization of the control means 20 and 22 is brought about by a pulse signal supplied by a comparator receiving the signal from position coder 24 and a signal supplied by regulating means 28 and detecting the equality of these signals, the comparator state change controlling the state (locked, unlocked) of the welding torch in accordance with each scanning direction.

Each displacement means 16, 18 comprises an amplifier 16a, 18a and a motor 16b, 18b. The rotation of motor 16b is speed-controlled in a conventional manner, each speed operating phase of given sense and duration corresponding to a pulse having given amplitude, sign and duration.

According to the invention, the means 20 for controlling the displacement along axis X supplies a speed control signal to displacement means 16. This control means comprises a processing means 21 and a speed servocontrol means 23.

Processing means 21 receives the position signal x supplied by position coder 24 and signal supplied by regulating means 28, 32, 30, respectively fixing the amplitude $x_M$ of the movement along axis X, the speed of said movement and the time lag $t_2$ in the maximum amplitude positions $\pm x_M$. It supplies a speed control signal $v_x$ to the speed servocontrol means 23. The latter controls the speed of the motor of the first displacement means 16 to bring about identity between the control speed $v_x$ and the variation $dx/dt$ of the signal x supplied by position coder 24. This means 23 is not obligatory, but can be useful in the case of low speed control.

The second control means 22 realizes a position control of the welding torch along axis Z. This control means comprises in series an amplifier and rectifier means 40, a processing means 42 and a position servocontrol means 44.

The amplifier and rectifier means 40 receives the position signal x supplied by position coder 24 and a signal indicating the slope $\alpha$ of the joint determined by the regulating means 24. It supplies a signal $z_1$. This signal is received by the processing means 42, which also receives the displacement signal supplied by regulating means 36, 38. These regulating means respectively define the rounded portion and a displacement along axis Z of the path of the torch. The position signal z supplied by said processing means is received by the position servo-control means 44. By a connection 46, the latter controls the motor of the second displacement means 18, in order to bring about identity between the desired position of the torch defined by signal z and the real position of the torch indicated by position coder 26.

Figure 5A:
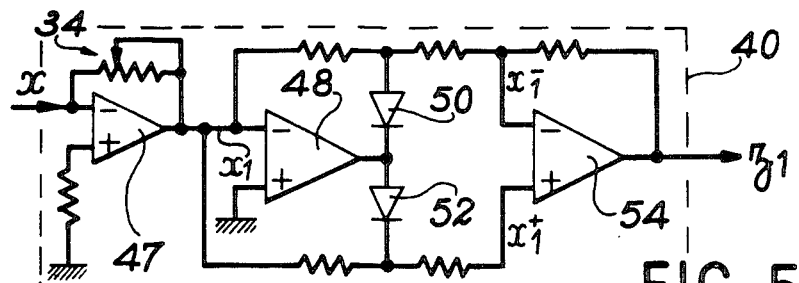
FIGS. 5a and 5b show an embodiment of a circuit for generating the law of motion in direction Z as a function of the speed signal in direction X.
Figure 5B:
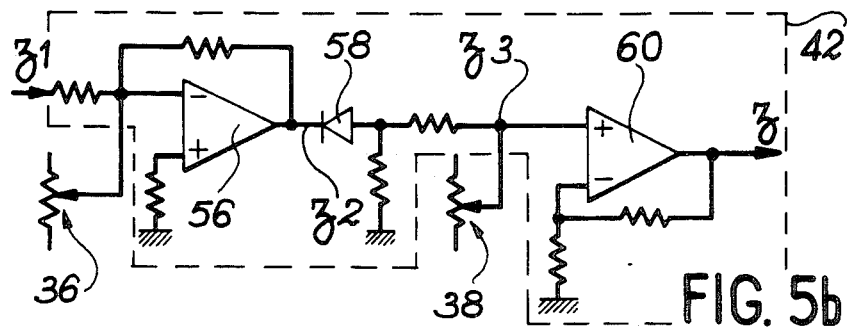

A description will now be given of an embodiment of each of the processing means 21, 42 and of means 40. FIGS. 5a and 5b respectively represent an embodiment of the amplifier and rectifier means 40 and of the processing means 42 of control means 22. The amplifier and rectifier means 40 shown in FIG. 5a supplies a signal $z_1$ as a function of the position signal x supplied by the position sensor along axis X.

It comprises an amplifier stage and a rectifier stage. The amplifier stage is constituted by a differential amplifier 47 connected as a negative gain voltage amplifier with a variable feedback resistor constituting the regulating means 34. Signal $x_1$ supplied by the amplifier stage is then rectified by the rectifier stage. The latter comprises a first differential amplifier 48, whose positive input is at earth and two feedback chains, each constituted by a diode 50, 52 and a resistor. The diodes are in opposite senses in the two chains. On the cathode of diode 50 appear the negative half-cycles of signal $x_1$, while on the anode of diode 50 appear the positive half-cycles of signal $x_1$. These signals are respectively applied to the inverting and non-inverting inputs of a differential amplifier 54, which supplies a signal $z_1$ equal to the rectified signal $x_1$.

Figure 6:
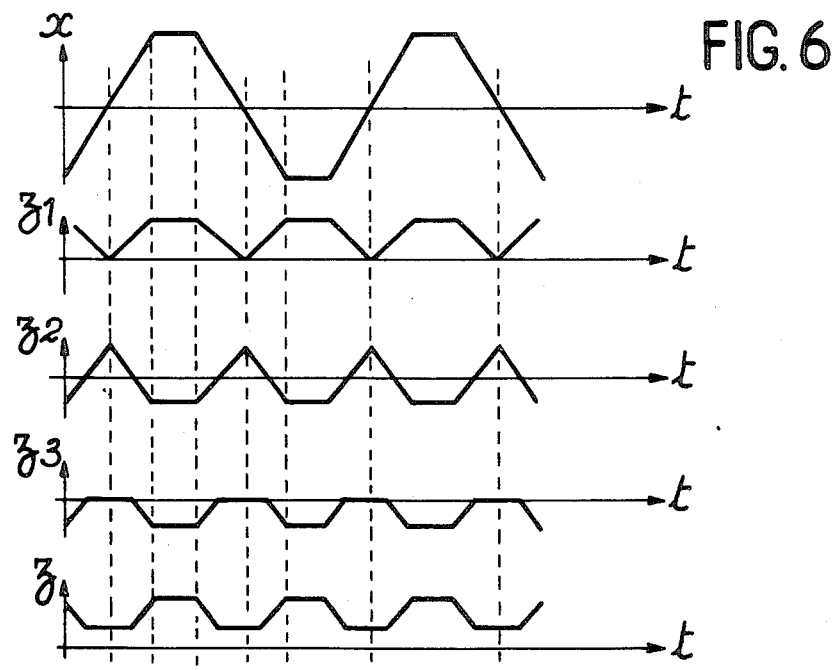
FIG. 6 is a chronogram of the signals produced by the circuit of FIGS. 5a and 5b.

Signal $z_1$ is shown in correspondence with signal x in FIG. 6. The ratio of the amplitudes of these signals and consequently the ratio of the slopes of said signals is linked with the angle $\alpha$ of the joint (FIG. 2). This relationship is fixed by regulating means 34.

FIG. 5b shows an embodiment of the processing means 42 for the position signal z from signal $z_1$. Signal $z_1$ is firstly received in a circuit comprising a differential amplifier 56 connected as a voltage inverter and the means for regulating the rounded portion 36. This assembly performs a displacement and then an inversion of signal $z_1$. The signal produced $z_2$ is represented in FIG. 6. This signal is applied to the anode of a diode 58, which clips its positive part. The resulting signal $z_3$ is shown in FIG. 6. This signal is processed in the same way as signal $z_1$, i.e. it is received in an assembly comprising a displacement means 38 and a differential amplifier 60 connected as a voltage inverter. The signal z obtained represents the position control of the welding torch in the scanning direction Z over a period of time.

This control signal z is then received in the position servocontrol means 44 (FIG. 4), which controls in a conventional manner the motor of the displacement means 18, so that the position coder 26 in direction Z indicates a position of the welding torch in accordance with a position reference.

Figure 7:
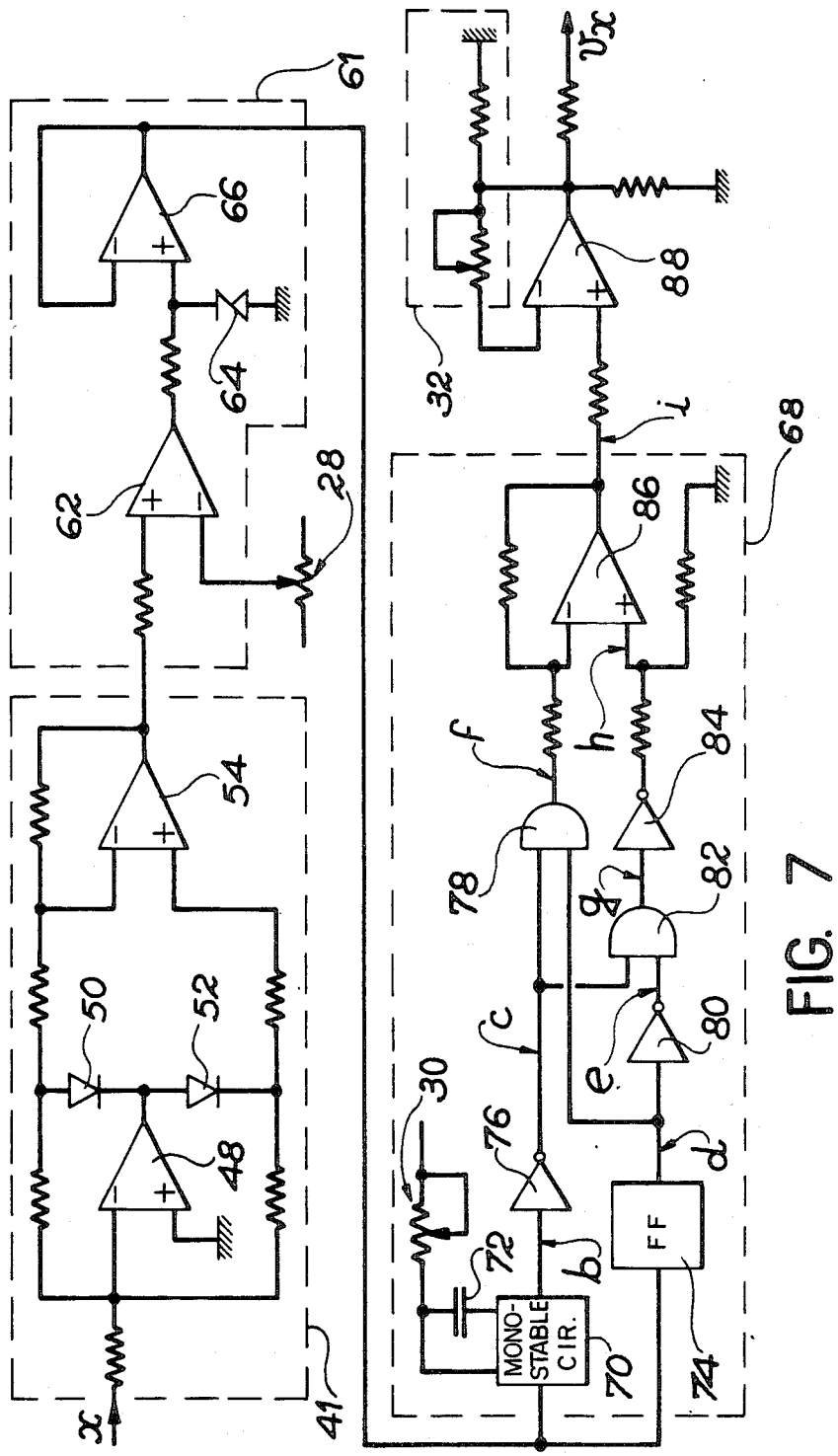
FIG. 7 shows an embodiment of the circuit for generating the displacement signal in direction X as a function of the speed signal in said same direction.

According to the invention, the displacement in the other scanning direction X is performed by a speed control. The processing means of the control means along said axis receives at the input the position x of the torch along axis X and supplies at the output a speed control signal $v_x$ relative to the torch along said axis. This voltage signal is in the form of a succession of positive, zero and negative square wave pulses, sequentially switched by pulses produced when the torch reaches two end positions $x_M$ and $-x_M$ along axis X. FIG. 7 shows an embodiment of this processing means and FIG. 8 a chronogram of the main signals of said processing means.

The position signal x received by the processing means is firstly rectified by a means 41 identical to the rectifier stage of means 40 of FIG. 5a. This rectified signal is then received at the non-inverting input of a comparator 62, which is a component of a digitization means 61. The inverting input of comparator 62 receives a reference signal defined by the regulating means 28, which in this way defines the amplitude $x_M$ of the movement along axis X. The two state signal supplied by comparator 62 is then processed by an assembly comprising a Zener diode 64 and an amplifier 66, whose output is relooped onto the inverting input. This assembly converts the signal supplied by comparator 62 into a logic signal (of level TTL if the Zener diode has a clipping voltage of 4.7 V), which permits its processing by logic means.

This logic signal supplied by means 61 is consequently in the high state when the absolute value of the abscissa of the welding torch is equal to or exceeds $x_M$ and in low state in the opposite case. This signal is processed by a means 68, which supplies voltage square wave pulses controlling in both quantity and sign the displacement speed of the welding torch along axis X.

Figure 8:
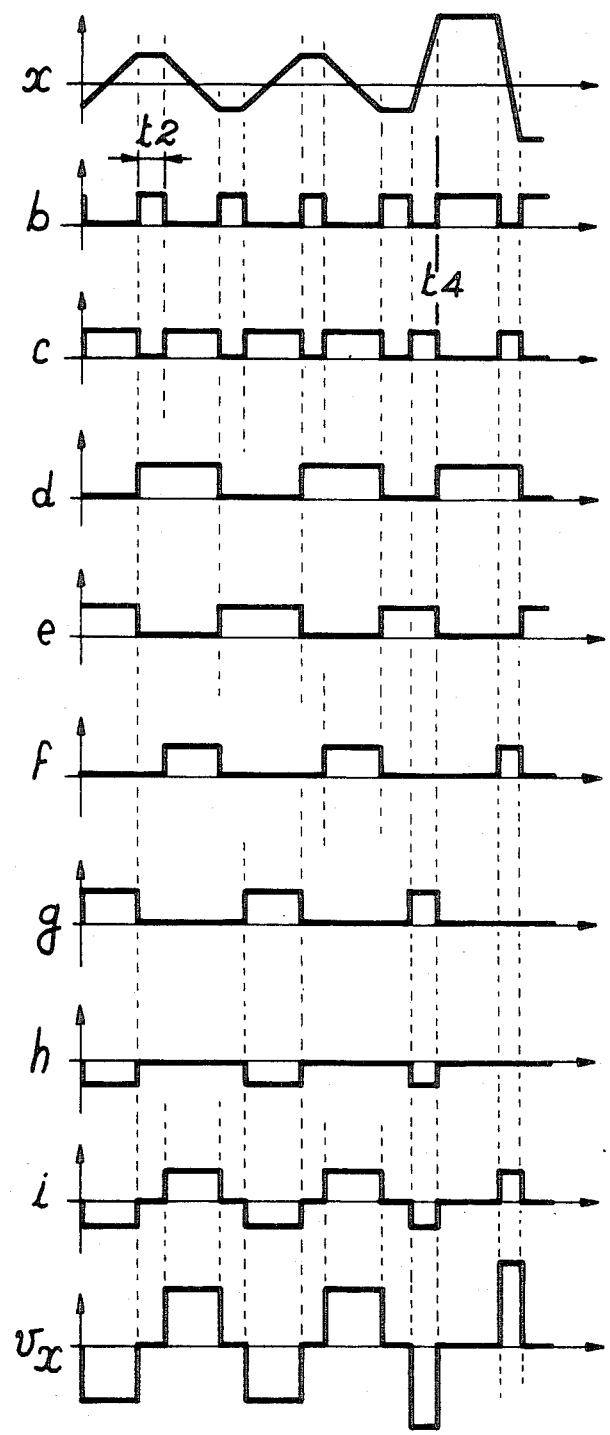
FIG. 8 is a chronogram of the signals of the circuit of FIG. 7.

The signal supplied by means 61 is received in a monostable circuit 70, whose period is fixed by a capacitor 72 and a regulatable resistor constituting the regulating means 30. Signal b supplied by monostable circuit 70 is represented in FIG. 8. The regulating means 30 determining the duration of the pulses of signal b makes it possible to fix the time lag of the welding torch in the maximum amplitude positions along axis X.

The logic signal supplied by means 61 is also applied to the input of a flip-flop 74, which supplies a signal d shown in FIG. 8. Signal d is received at an input of an AND-gate 78, whose other input receives the signal c obtained by inversion of signal b in a logic inverter 76. Another AND-gate 82 receives at its input the signal c and the signal e obtained by inversion of signal d in a logic inverter 80.

Signals f and g produced by said AND gates 78 and 82 are shown in FIG. 8. These are signals in the form of square wave pulses, which are in the high state when the welding torch has respectively a negative and positive speed along axis X.

Finally, circuit 68 comprises an adder constituted by a differential amplifier 86, whose inverting input receives signal f and whose non-inverting input receives signal h obtained by inversion of signal g in a logic inverter 84. Signal i produced by said circuit 68 is shown in FIG. 8. It is a bipolar signal in square wave pulse form indicating the sign of the speed along axis X. The displacement speed along axis X is constant and of the same sign as said signal i.

This signal is finally received in a differential amplifier 88, whose gain can be adjusted by a variable resistor constituting the regulating means 32. The supplied signal $v_x$ is proportional to signal i and its amplitude, fixed by regulating means 32, defines the speed of the torch along axis X.

The position signal x of the welding torch shown in FIG. 8 corresponds to three oscillations. During the first two oscillations, the signals supplied by the regulating means are constant. The third oscillation differs, because the speed, amplitude of the movement and the time lag of the probe movement have been modified by acting on regulating means 32, 28 and 30.

The modification of the speed appears on signal $v_x$, where the last two pulses have a greater amplitude than the preceding pulses. The modification of the amplitude of the movement leads to a rising pulse front of signal b at $t_4$ for a greater amplitude of signal x than for the preceding pulses of signal b. Finally, the modification of the duration of the time lag leads to a different pulse width of signal b.

The modification of the oscillation movement x of the welding torch has been shown when the signals supplied by each of the regulating means are modified. It is obvious that these modifications are independent and that it is possible to act on a single regulating means.

The circuits described relative to FIGS. 5a, 5b and 7 are consequently able to control the oscillatory movements of the welding torch in two directions, which produces the scanning movement. The regulating means associated with the control means make it possible to independently vary each parameter of the oscillatory movement laws.

The starting then of the scanning apparatus takes place automatically when energization takes place. On starting the motor and as a function of the initial position of the welding torch, a transient movement of the torch can occur prior to the nominal scanning movement. No matter what the sign of the voltage square wave pulse for starting the motor, said transient movement will bring the torch into a normal position.

This transient movement takes place if, on starting the motor, the position coder along axis X indicates an amplitude which is higher or lower than the maximum $x_M$ or minimum $-x_M$ amplitude defined by regulating means 28.

In this case, comparator 62 (FIG. 7) detects the passing beyond the position and produces a pulse (signal b) which itself produces a speed square wave pulse. If the latter produces a movement increasing the amplitude of the welding torch, the comparator 62 again produces a pulse (signal b), which produces a speed square wave pulse of opposite sign. The welding torch then has a movement bringing it back into the range $[-x_M, +x_M]$, the torch movement then being the normal scanning movement. If the first speed square wave pulse brings the torch back into the range $[-x_M, +x_M]$, the normal scanning operation occurs without any further pulse being emitted by the comparator.

Finally, in the case where the welding torch position is between $-x_M$ and $+x_M$ on starting the motor, the normal scanning movement takes place from the outset.

FIGS. 4 to 8 described hereinbefore illustrate apparatus for performing the scanning movement shown in FIGS. 3a and 3b and the operation of said apparatus.

The scanning movement described only constitutes one example of a scanning movement which can be produced according to the invention. A description will now be given of two variants of this scanning movement and details will be given of the modifications made to the apparatus of FIG. 4 for performing these variants.

The chronograms of FIGS. 9a and 9b illustrate a first variant, in which the scanning movement is no longer centered on the axis of the joint and is instead displaced in direction X. In these chronograms, the references identical to those of the chronograms of FIGS. 3a and 3b have the same meanings. The movement in direction X is between amplitudes $X_{M1}$ and $-X_{M2}$, which are not identical.

The scanning movement shown in FIGS. 9a and 9b is performed by the apparatus of FIG. 10, which is substantially identical to that described relative to FIG. 4. It differs solely by the addition of an adder 90, which on the one hand receives the signal supplied by position coder 24 and on the other hand a displacement signal produced by a potentiometer 92. The signal supplied by adder 90 constitutes the reference signal applied to the control means 20 and 22. The assembly formed by adder 90 and potentiometer 92 constitutes a means 94 for regulating the displacement according to a first direction X.

FIGS. 11a and 11b show another variant of the scanning movement of the welding torch. The displacement of the torch is locked in direction Z, when it moves in a particular sense, in this case the decreasing sense, in the first direction X.

For realizing this scanning movement, use is made of an apparatus like that described in FIG. 4, to which has been added a means 96 receiving the position signal supplied by position coder 24 and supplying a signal to processing means 42. In addition, a switch is positioned behind diode 58 (FIG. 5b) in order to apply either signal $z_3$, or a zero signal to differential amplifier 60.

This switch is controlled by a relay activated by the signal supplied by means 96. The latter comprises a differentiator followed by a sign detector. When the sign of the differentiated signal is negative, means 96 controls the switch to connect the input of differential amplifier 60 to earth. When the sign of the differentiator is positive or zero, means 96 controls the switch in order to apply signal $z_3$ to differential amplifier 60.

We claim:
1. An apparatus for scanning a member in a scanning plane perpendicular to its forward movement direction, comprising a first displacement means for the displacement of said member in a first direction contained in said scanning plane, a second displacement means for the displacement of said member in a second direction contained in said scanning plane, a speed control means connected to said first displacement means and controlling the movements of said member in said first direction, wherein said apparatus also comprises a first position coder supplying a position signal indicative of the position of said member along said first direction, a position control means connected to said second displacement means and controlling the movement to said member in said second direction, said position control means receiving said position signal supplied by said first position coder, and said speed control means and said position control means being synchronized by a signal which is a function of the result of a comparison between the amplitude of said position signal and a reference amplitude.

2. An apparatus according to claim 1, wherein the speed control means supplies a pulse signal to the first displacement means.

3. An apparatus according to claim 1, wherein the regulating means are connected to the speed control means and to the position control means, said regulating means fixing the value of the parameters of the movement of the member in the first and the second directions.

4. An apparatus according to claim 3, wherein the regulating means associated with the speed control means comprise a means for regulating the speed of the member in the first direction, a means for regulating a time lag period in the movement of the member in the first direction and a means for regulating the amplitude of the displacement of the member in the first direction.

5. An apparatus according to claim 4, wherein the speed control means supplies a pulse signal to the first displacement means and the speed regulating means and the time lag regulating means respectively act on the amplitude and duration of the pulses supplied by the speed control means.

6. An apparatus according to claim 4, wherein the amplitude regulating means fixes the reference amplitude.

7. An apparatus according to claim 3, for a member having a forward movement along a joint between two parts, said member having a scanning movement in a scanning plane perpendicular to the direction of said joint, the first direction being parallel to the bisector of the joint and the second direction being perpendicular to said bisector, wherein the regulating means associated with the position control means comprise a means for regulating the slope of the movement of the member along the sides of the joint in the scanning plane, a means for regulating a rounded portion of the movement of the member in said joint and a means for regulating the amplitude of the displacement along said second direction.

8. An apparatus according to claim 7, wherein the means for regulating the slope of the movement of the member along the sides of the joint applies a gain to the position signal along the first direction.

9. An apparatus according to claim 7, wherein the means for regulating the rounded portion of the movement of the member in said joint brings about an offset and a rectification of the signal processed of said position control means.

10. An apparatus according to claim 7, wherein said means for regulating the amplitude of the displacement effects a signal offset.

11. An apparatus according to claim 1, wherein the speed control means comprises a first processing means, which receives the signal supplied by the first position coder and which supplies a speed control signal, and a speed servocontrol means controlling the first displacement means for moving said member in said first direction in accordance with said speed control signal.

12. An apparatus according to claim 1, wherein said apparatus also comprises a second position coder and wherein the position control means comprises in series an amplifier and rectifier means receiving the signal supplied by the first position coder, a second processing means supplying a position control signal and a position servocontrol means controlling the second displacement means in accordance with said position control signal and said signal supplied by said second position coder.

* * * * *